United States Patent [19]

Gellert et al.

[11] 4,347,454
[45] Aug. 31, 1982

[54] STATOR WINDING FOR AN ELECTRIC MACHINE

[75] Inventors: Klaus Gellert; Günter Nagel; Franz J. Pollmeier, all of Berlin, Fed. Rep. of Germany

[73] Assignee: Siemens Aktiengesellschaft, Munich, Fed. Rep. of Germany

[21] Appl. No.: 67,145

[22] Filed: Aug. 16, 1979

[30] Foreign Application Priority Data

Aug. 17, 1978 [DE] Fed. Rep. of Germany ....... 2836229

[51] Int. Cl.³ .............................................. H02K 19/26
[52] U.S. Cl. ..................................... 310/193; 310/45; 310/179; 310/196; 310/214
[58] Field of Search ................ 310/193, 194, 214, 45, 310/208, 179, 180, 271, 198, 91, 254, 216, 196, 189, 192, 42, 259; 339/106; 174/135; 336/197; 361/2, 112, 212

[56] References Cited

U.S. PATENT DOCUMENTS

| 2,258,343 | 10/1941 | Walker | 339/106 |
| 2,898,396 | 8/1959 | Watson | 174/23 R |
| 3,735,168 | 5/1973 | Anderson | 310/45 |
| 3,749,950 | 7/1973 | Lenz | 310/271 |
| 4,008,409 | 2/1977 | Rhudy | 310/45 |

FOREIGN PATENT DOCUMENTS

| 94122 | 9/1923 | Austria | 310/45 |
| 932013 | 8/1973 | Canada | 310/45 |
| 443632 | 3/1924 | Fed. Rep. of Germany | 310/196 |
| 649877 | 8/1937 | Fed. Rep. of Germany | 310/196 |
| 881086 | 5/1953 | Fed. Rep. of Germany | 310/215 |
| 1106856 | 5/1961 | Fed. Rep. of Germany | 310/215 |

Primary Examiner—R. Skudy
Attorney, Agent, or Firm—Kenyon & Kenyon

[57] ABSTRACT

The bars or coils of the stator winding of an electric machine are provided, in the region of the slots, with one or more additional wrappings having a larger cross-section than the slot. These wrappings are set in corresponding recesses in the laminated stack, whereby the bars are made secure in the axial direction.

2 Claims, 1 Drawing Figure

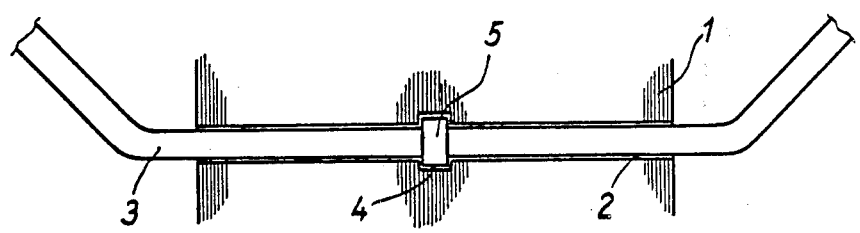

STATOR WINDING FOR AN ELECTRIC MACHINE

BACKGROUND OF THE INVENTION

1. Field of the Invention

The invention relates to stator windings for an electric machine. More particularly, it relates to stator windings consisting of the bars or coils inserted into slots of the laminated stack, in which the insulation, due to additional wrapping, has larger cross sections in some places than the slot.

2. Description of the Prior Art

Such bars or coils are described in Austrian Pat. No. 94121. In these known bars, the slot insulation is reinforced by the addition of wrapping at places which lie immediately outside the slot on the faces of the laminated stack, so that therefore the cross section of the insulation is larger there than in the slot. This is intended to prevent corona at the points where the bar leaves the slot.

Such a reinforcement of the winding cross section at the exit of the slot, outside the laminated stack, also serves to limit displacement of the bar in its axial direction. However, because of the necessity of providing tolerances, the bar cannot be completely prevented from slipping in the slot and thus, in spite of these precautions, damage to the protective outer corona coating is possible.

It is an object of the invention to secure the bars or coils of the stator winding of an electrical machine and to prevent individual winding elements or entire windings from wandering in the laminated stack.

SUMMARY OF THE INVENTION

According to the invention, this problem is solved, in a stator winding of an electric machine of the type described at the outset, by arranging one or several additional wrappings on the bar or the coils located within the slot, and by providing a corresponding recess in the laminated stack at each of these points. The bars or coils are secured against motion in the axial direction in the region of the slots by this enlargement of the cross section, which engages and is locked in a recess of the laminated stack. This assures prevention of wandering. Advantageously and to faciliate production, only a single enlargement in the center of the laminated stack need be provided. When possible, radial cooling canals, which may already be available in the laminated stack, can be utilized to receive the wrapping, thereby securing the bar.

The wrapping is very easily fabricated, for instance, by the additional wrapping of mica tapes, glass tapes, woven fabric tapes, etc., onto the normal winding insulation. In the alternative, the enlargement of the cross section of the insulation can also be accomplished by applying a collar of plastic or metal.

BRIEF DESCRIPTION OF THE DRAWING

The sole drawing is a view, in partial cross section, of a portion of the stator winding of an electric machine fabricated in accordance with the invention.

DETAILED DESCRIPTION OF THE INVENTION

The illustrative embodiment of the invention is shown in the drawing by a longitudinal section taken through the laminated stator of an electric machine. The laminated stack 1 of the stator of the electric machine has a number of slots 2, of which only one is shown, for receiving bars 3 of the stator winding. The center of slot 2 in laminated stack 1 is provided with a recess 4.

An additional wrapping 5, of sufficient thickness to make the overall dimensions of the bar and the insulation greater than the dimensions of the slot, is applied to the bar at a point along its length corresponding to the location of the recess.

Wrapping 5, therefore, is locked in recess 4 of the laminated stack so that winding bar 3 cannot move in the axial direction. This prevents wandering of the individual winding elements and damage to the outer corona protection.

While a single wrapping 5, located centrally on the winding bar or coil, is a preferred form of the invention, it will be understood that more than one such wrapping, located at other points on the winding bar and received in corresponding recesses in the lamination stack, can be used.

What is claimed is:

1. A stator winding assembly for an electric machine comprising:
    a stack of stator laminations formed with at least one slot having a given cross-section along its length, the cross-section of the slot being enlarged at at least one point along the slot to provide at least one recess in the laminations, each such recess surrounding the slot and bounded on its sides and bottom by the lamination stack; and
    a winding inserted in the slot, the winding comprising at least one insulated conductor having a protective outer corona coating, and at least one portion of the winding, at at least one point corresponding to the position of a recess having an enlarged cross-section comprising a wrapping of insulating tape adapted to engage and lock in the recess to secure the winding against motion in the axial directon.

2. A stator winding assembly in accordance with claim 1 in which there is only one recess and the recess is located in the center of the stack of laminations, and in which the portion of enlarged cross-section is located centrally on the winding.

* * * * *